(12) United States Patent
Wastling et al.

(10) Patent No.: US 7,172,392 B2
(45) Date of Patent: Feb. 6, 2007

(54) PASSIVE SPEED AND POWER REGULATION OF A WIND TURBINE

(75) Inventors: Michael Andrew Wastling, Leicestershire (GB); John Charles Balson, Nottingham (GB); David Irving, Plymouth (GB); Robert James Cann, Nottingham (GB)

(73) Assignee: Iskra Wind Turbine Manufacturers Ltd., Nottingham (GB)

( * ) Notice: Subject to any disclaimer, the term of this patent is extended or adjusted under 35 U.S.C. 154(b) by 133 days.

(21) Appl. No.: 10/502,856

(22) PCT Filed: Feb. 25, 2002

(86) PCT No.: PCT/GB02/00819

§ 371 (c)(1),
(2), (4) Date: Mar. 24, 2005

(87) PCT Pub. No.: WO03/071129

PCT Pub. Date: Aug. 28, 2003

(65) Prior Publication Data

US 2005/0201862 A1  Sep. 15, 2005

(51) Int. Cl.
 *F03D 7/04* (2006.01)
(52) U.S. Cl. .................... 416/43; 416/44; 416/135; 416/147; 416/202; 416/206
(58) Field of Classification Search ............... 416/43, 416/44, 135, 202, 147, 206
See application file for complete search history.

(56) References Cited

U.S. PATENT DOCUMENTS

| 4,257,740 | A | * | 3/1981 | Duez | 416/137 |
| 4,348,154 | A | * | 9/1982 | Ducker | 416/43 |
| 4,439,108 | A | * | 3/1984 | Will | 416/131 |
| 4,632,637 | A | | 12/1986 | Traudt | |
| 5,226,805 | A | | 7/1993 | Proven | |

FOREIGN PATENT DOCUMENTS

| DE | 35 43 460 A | 8/1986 |
| EP | 0 095 807 A | 12/1983 |

* cited by examiner

*Primary Examiner*—Ninh H. Nguyen
(74) *Attorney, Agent, or Firm*—Nixon Peabody LLP

(57) ABSTRACT

A wind turbine with at least one blade having a pitch axis that is offset laterally so that the blade does not intersect with an axis of rotation of the wind turbine, and a center of mass and an aerodynamic center are offset from the pitch axis in the direction parallel to the axis of rotation of the wind turbine. The blade is arranged so that the blade can pitch towards stall against the action of a resilient device and also so that the centrifugal loading on at least one of the blade and one or more components optionally attached to the blade, acts against the spring in a direction to shed power by pitching the blade towards stall and also so that the torque loading provided by a power conversion device acts to pitch the blade in the opposite direction, so as to reduce the amount of load shedding whenever the power is being extracted from the wind turbine.

13 Claims, 10 Drawing Sheets

PASSIVE SPEED AND POWER REGULATION OF A WIND TURBINE

This application is a national stage application under 35 U.S.C. § 371 from PCT Application No. PCT/GB02/00819 filed Feb. 25, 2002.

FIELD OF THE INVENTION

This invention relates to a passive speed and power regulation system for a wind turbine.

BACKGROUND OF THE INVENTION

Wind turbines are well known devices used to extract energy from the wind. Most commonly these are horizontal axis machines with two or more blades. A key design challenge for all such machines is the need to regulate the power extracted from the wind to avoid excessive rotor speed or overload of the generator in high winds. One method of achieving this is through altering the pitch angle of the blades. This can be achieved either through active regulation (for example using electrical or hydraulic actuators) or passive means. Passive regulation involves the use of the forces that are naturally present within the wind turbine to pitch the blades against a spring or deform the blades or their attachment points.

The forces that are naturally present include the centrifugal loads acting on the wind turbine blades, the torque in the main shaft and the thrust load acting axially along the main shaft. These forces may be used in many different physical configurations to pitch the blades. Pitching of the blades may either be towards feather (to reduce the aerodynamic angle of attack and therefore reduce the aerodynamic lift force that is providing the power to the wind turbine) or towards stall. Pitching towards stall increases the angle of attack and can therefore increase power initially, but eventually the pitch angle will be reached where the blades will 'stall' and the aerodynamic lift will be lost and the aerodynamic drag will increase. Thus the wind turbine will lose its ability to produce power.

SUMMARY OF THE INVENTION

There are several existing methods used to achieve passive blade pitch, including methods that use each of these forces. This patent describes a different method, which exploits the combination of both centrifugal loads on the blades, and shaft torque loads to give an improved method of pitch control that works irrespective of whether the generator is providing electrical power. It is not only the combination of these forces that is significant, but also the direction in which they operate. The centrifugal load acts to shed power by pitching the blades towards stall and the shaft torque load acts in the opposite direction to reduce the amount of blade pitching and therefore reduce the amount of power-shedding.

The present invention involves the combination of centrifugal loading on the wind turbine blades, or components attached to them and the use of the generator reaction torque, to provide protection of a wind turbine against over-speeding and against producing too much power. The method of protection works irrespective of how much power the consumer is demanding of the wind turbine through the generator. The protection is achieved through passive pitch regulation, such that the centrifugal loading acts to try to pitch the blades away from the optimum position for energy capture towards stall so as to shed power. The generator reaction torque (if present) acts in the opposite direction to reduce the amount of pitch movement and therefore reduce the amount of power shedding.

A geometric configuration is presented that achieves this combination of attributes.

According to the invention, there is provided a wind turbine as defined in claim 1. More specific and/or preferred features of the invention are set out in the dependent claims.

In a specific embodiment of the invention a means of attaching the blades to the wind turbine results in a partial cancellation of some of the local loads normally imposed on the hub. This is achieved by attaching each blade both at its end and at a second outer location. The blades are arranged so that each outer blade attachment point is as close as possible to the adjacent blade's end attachment point. Since the loads associated with adjacent blades are largely equal and opposite, this greatly reduces the severity of the local loads transferred to the hub from the blades. This is particularly beneficial if the blades are attached directly onto the rotor of a direct drive generator, since it is important to minimise distortion of the generator and the variation in the generator air gap.

It is desirable that the turbine blades are linked so that they have identical pitch setting at all times. Two different means of achieving this are also described.

The first method involves a compact means of linking a number of blades with the geometry outlined above, applying a preload and resilient resistance to blade pitch, and allowing the blade to be linked in pitch whilst minimising the loads carried by the linkage mechanism.

This method uses pushrods attached to a pitch lever on each blade which act against a resilient member such as a compression spring. The pushrod is restrained in its movement in order to act as a fixed stop to define the optimum blade pitch position and in conjunction with the spring to both apply a preload and offer a resistance in proportion to further blade pitch.

A profiled pitch linkage plate is mounted such that it is able to rotate about the main axis of the turbine. The apices of this plate are each connected to one of the blade pushrods in such a manner that the plate will rotate as a consequence of blade pitch thereby constraining the blades to ensure identical pitch. By connecting the plate directly to the pushrods the loads transmitted by the rotating plate are reduced by eliminating the need to transmit pitch preload or pitch resistance loads.

The second method has the additional benefits of offering both a means of stopping the turbine completely in high winds, and providing a damping force proportional to the rate of change of blade pitch. This can improve the dynamic characteristics of the pitch motion.

In this arrangement rigid members known as pitch arms are attached to the blades so that they rotate when the blades pitch. The other ends of these pitch arms are connected by means of a pinned joint to a rigid annulus which is allowed to rotate about the rotor axis. The arc described by the end of each pitch arm due to rotation of the blade in pitch has two components, one parallel to the main axis of the turbine (the 'axial component') and one in the plane of rotation of the hub ('the in-plane component').

The in-plane component of the arc described by the end of each pitch arm results in rotation of the annulus thereby restraining each blade to identical pitch angle and change of pitch.

The axial component of the arc described by the end of each pitch arm displaces the annulus axially. If the annulus is restrained axially by means of a resilient member which provides a resistance proportional to the degree of rotation of the blade in pitch, and the axial movement of the annulus is limited in one direction by means of fixed stops in order to give a set initial blade pitch angle, a pre-load can be applied to the resilient member so that the blade pitch moment must reach a set level before the blade begins to change pitch.

The resilient biasing member may comprise a circular diaphragm which can be elastically deformed in an out of plane direction such that axial movement away from its equilibrium position results in a resistance proportional to its deflection. The circular diaphragm is constrained axially and radially but is allowed to rotate about the rotor axis. A preload may be introduced in the diaphragm spring by restraining the blades from pitching past a certain point using fixed stops and by securing the centre portion of the diaphragm at a position axially removed from its un-deformed position.

The rigid annulus may be connected to a surface so disposed with relation to the wind direction that due to its significant aerodynamic resistance to the wind it exerts an axial force on the annulus which increases with the wind speed.

The force exerted by this surface acts to move the rigid annulus and hence the ends of the pitch arms axially thereby causing the blades to pitch towards a stall position once the pre-load in the diaphragm is overcome by the combination of blade pitch moment due to centrifugal forces and the aerodynamic force on this surface. This will tend to maintain the blades in stall in extreme wind conditions and result in lower rotational speeds.

The axial movement of the surface which results from a change in pitch of the blades due to rotation about their pitch axes is also resisted by a force proportional to the speed of axial deflection due to the air resistance of the surface thereby providing a damping force to oppose changes in blade pitch. This damping force will increase in proportion to the rate of change of blade pitch thereby resisting rapid changes in blade pitch. An example of a geometric layout that achieves the requirements for blade passive pitch presented above, and examples of how this layout may be realised will now be described with reference to the following drawings in which:

DETAILED DESCRIPTION

Figure 1:
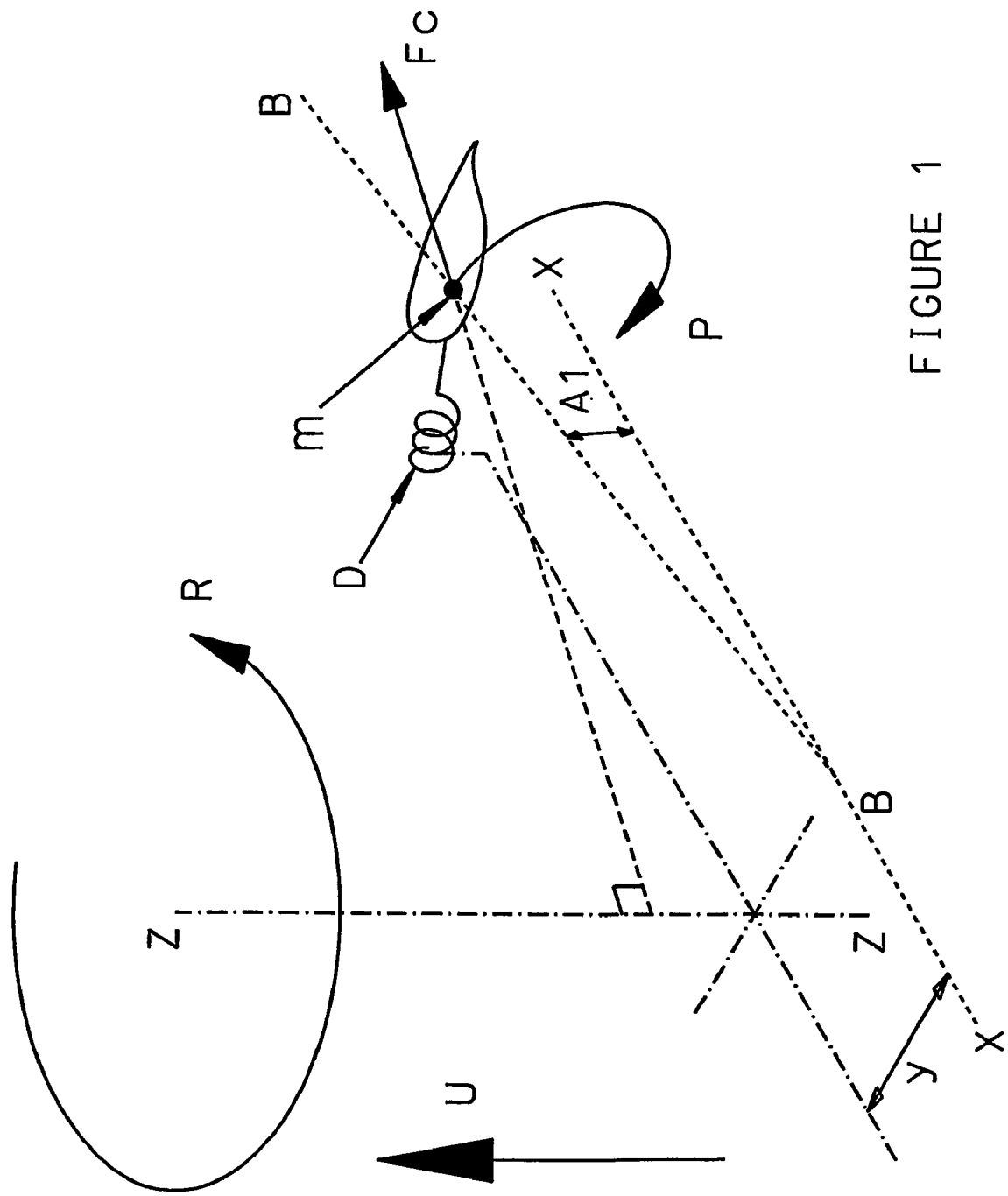
FIG. 1 shows the geometry of the blade attachment and pitch axis.

A geometric arrangement that achieves the requirements for blade passive pitch is shown in FIG. 1. The figure shows only one blade for clarity. The turbine main axis is shown by (Z—Z), the direction of rotation by (R), and the direction of the wind by (U). The blade is mounted so that it can rotate about a pitch axis (X—X), which is offset radially by a distance (y) relative to the axis of the main shaft (Z—Z). The blade axis (B—B) is inclined at an angle (A1) to the pitch axis (X—X). The centre of mass of the blade (m) lies on the blade axis (B—B).

A pre-loaded resilient member such as a spring (D), holds the blade against a hard stop at the optimum pitch position for maximising energy capture. The wind turbine blade is arranged so that it can pitch towards stall, but is restrained from doing so by the preloaded spring. The blades are held at this optimum pitch angle until the loads acting to pitch the blades are sufficient to overcome the pre-load and start to pitch the blades towards stall in the direction of arrow (P).

This arrangement has two characteristics. Firstly, the centrifugal loading acting on the blade when the wind turbine is rotating (Fc) has a component that acts to try to pitch the blade about the pitch axis (X—X). It is arranged so that this force acts to try to overcome the preloaded spring and pitch the blade towards stall so as to shed aerodynamic power.

Secondly, if the blade is producing power, then it will be generating an aerodynamic torque about the axis of the main shaft (Z—Z), as indicated by arrow (R). If the generator is not generating power it will not be providing a reaction to this torque and the aerodynamic torque will simply cause the rotor to accelerate and it will not directly influence the pitch angle (provided that most of the rotational inertia of the system is in the blades and not the generator). However, if the generator is connected to a load, then it will provide a reactive torque that may or may not be sufficient to prevent the rotor from accelerating. This reactive torque also has a component that acts to try to pitch the blades. The geometry is such that the generator torque acts to pitch the blade away from stall towards the optimum energy capture position.

The key to understanding the benefits of this geometry require a comparison between what happens when the generator is not connected to a load (and the wind turbine is freewheeling) and when it is connected to a load and is producing power.

If the generator is not connected to an electrical load, then the wind turbine will effectively be freewheeling. At the maximum allowable speed, the spring force can be set so that the centrifugal force is able to overcome the pre-load and pitch the blades sufficiently to prevent any aerodynamic power generation, so as to prevent any further acceleration (typically this will be 15 to 20° towards stall).

If the wind turbine generator is producing power in light to moderate wind, no pitching will be required since the generator will be able to limit the speed of the wind turbine. In high winds some pitching will be required to ensure that at the same maximum allowable rotational speed, the aerodynamic power produced does not exceed that being converted to electricity by the generator, so as to prevent any further acceleration. This will require a smaller change in pitch than required if the generator were not in use. The geometry of the wind turbine can be configured to ensure that the generator reaction torque makes sufficient contribution to the pitch moment to reduce the amount of load shedding by just the required amount.

Therefore, this combination of features allows the wind turbine to have a defined maximum allowable rotational speed that will not be exceeded irrespective of whether the generator is connected to a load or the wind turbine is simply freewheeling.

Figure 2:
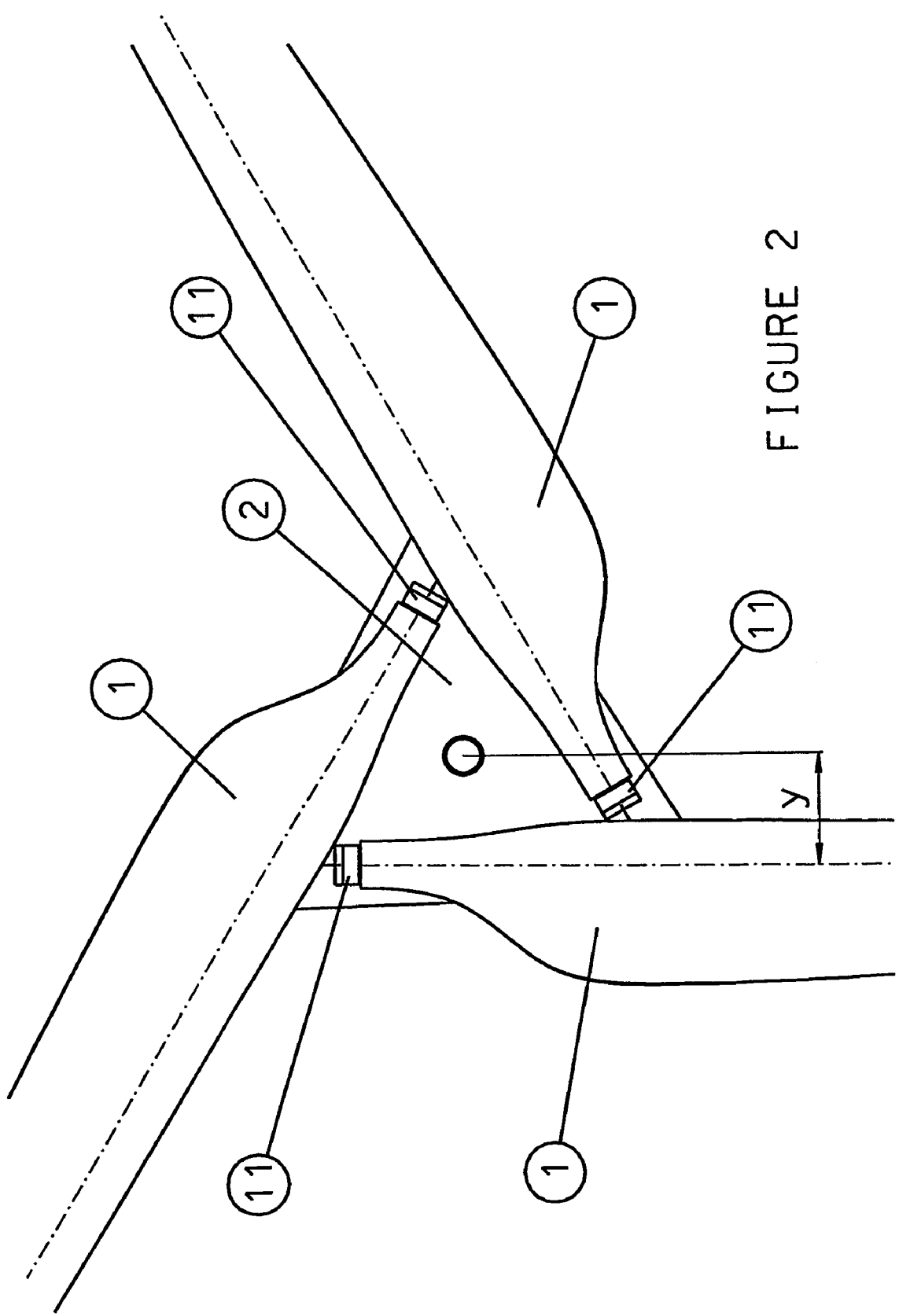
FIG. 2 is a view on the main axis of the turbine rotor of a first embodiment of the invention showing the arrangement of the blades on a triangular hub plate with the pitch control components removed for clarity.
Figure 3:
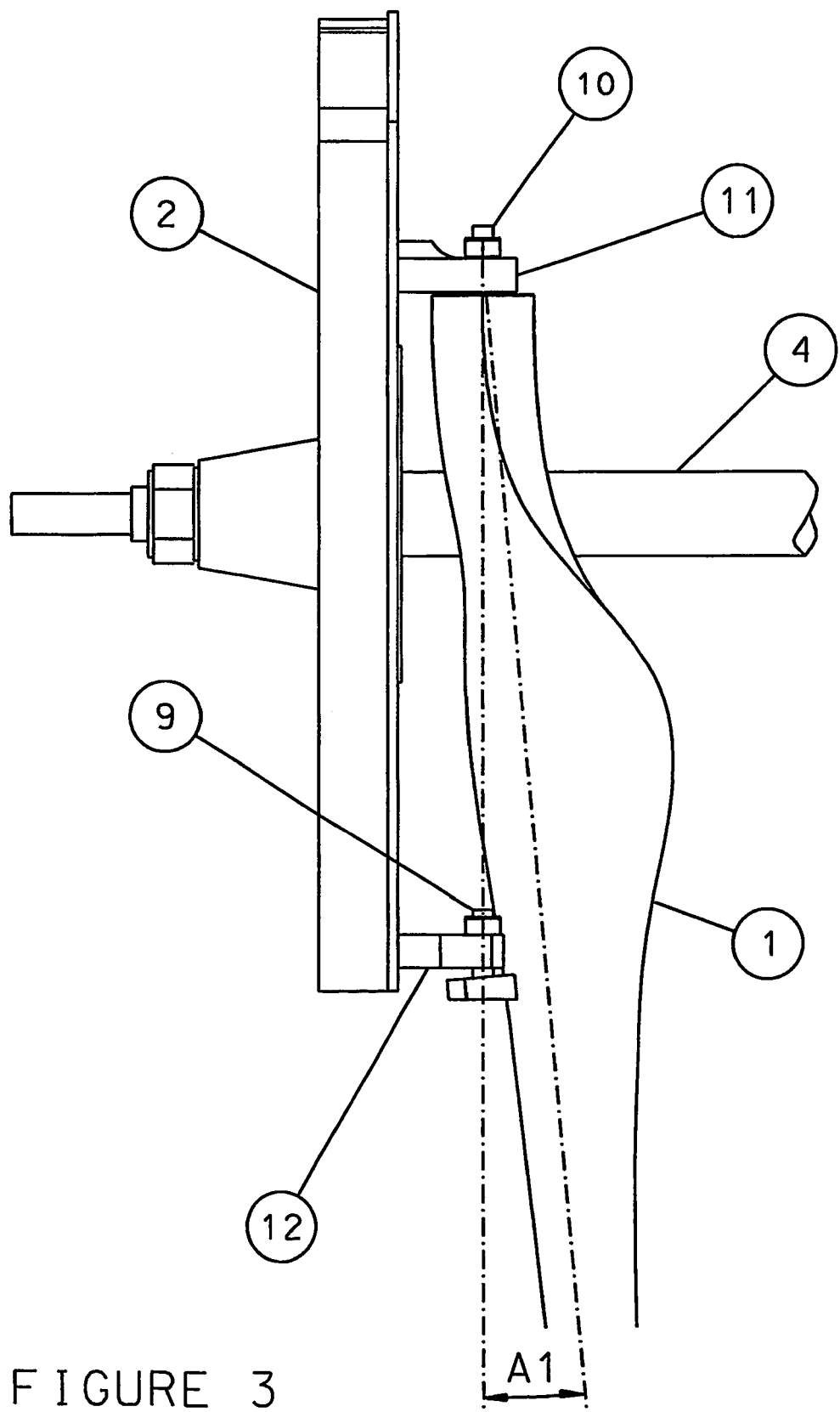
FIG. 3 is a side elevation of the turbine rotor showing the arrangement of one blade attached to the hub and with the pitch control components and other blades removed for clarity.

Additionally, geometry suited to the requirements for the passive pitch arrangement detailed above can be arranged so that the severity of the loads transferred to the hub is greatly reduced. This is illustrated in FIGS. 2 and 3 in which three blades (1), which rotate about a shaft (4), are each attached to the hub plate (2) both at their ends (11) and at a second outer location (12). The blades (1) are arranged so that each outer blade attachment point (12) is as close as possible to the adjacent blade's end attachment point (11). Since the loads associated with adjacent blades are largely equal and opposite, this greatly reduces the severity of the local loads transferred to the hub from the blades.

It is preferable that the turbines blades have identical pitch setting at all times. In order to achieve this it is necessary for the blades to be mechanically linked. Two different methods of ensuring this matching of blade pitch setting are proposed.

Figure 4:
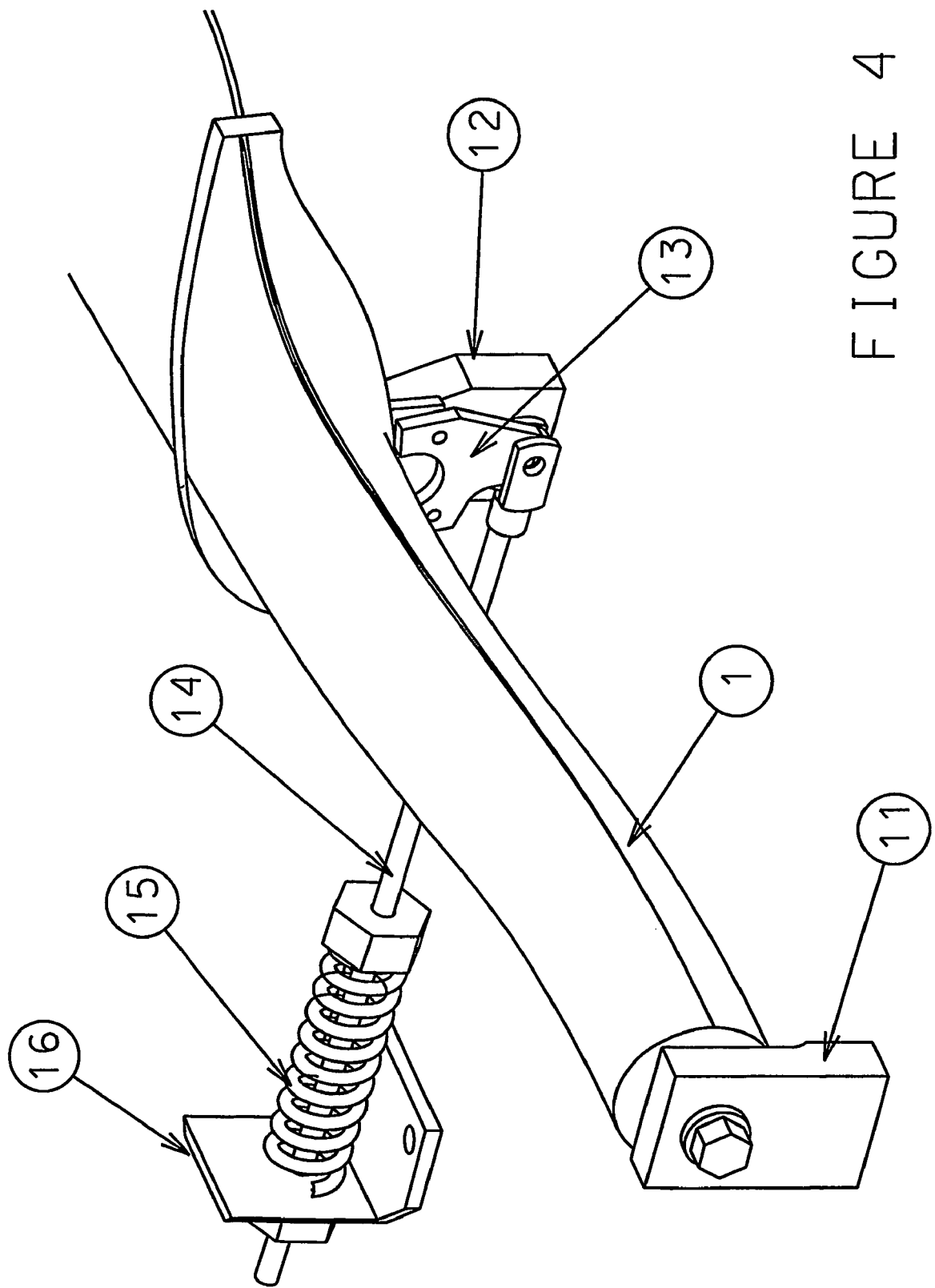
FIG. 4 is a view on the underside of one blade showing the pitch lever, pushrod, compression spring and spring fixture.

In the first method, (see FIG. 4), each blade (1) is rotatably mounted on a blade end attachment (11) and an outer blade attachment (12). A pitch lever (13) is rigidly attached to the underside of the blade so that it rotates with the blade (1) in pitch. The pitch lever (13) is connected to a pushrod (14) which is acted on by a spring (15) and also is constrained by a spring bracket (16). This both acts as a fixed stop so that the blade can only pitch in the direction towards stall and applies a preload to the spring (15). The spring bracket (16) and pushrod (14) hold the blade (1) at a set position against the preload of the spring (15).

Figure 5:
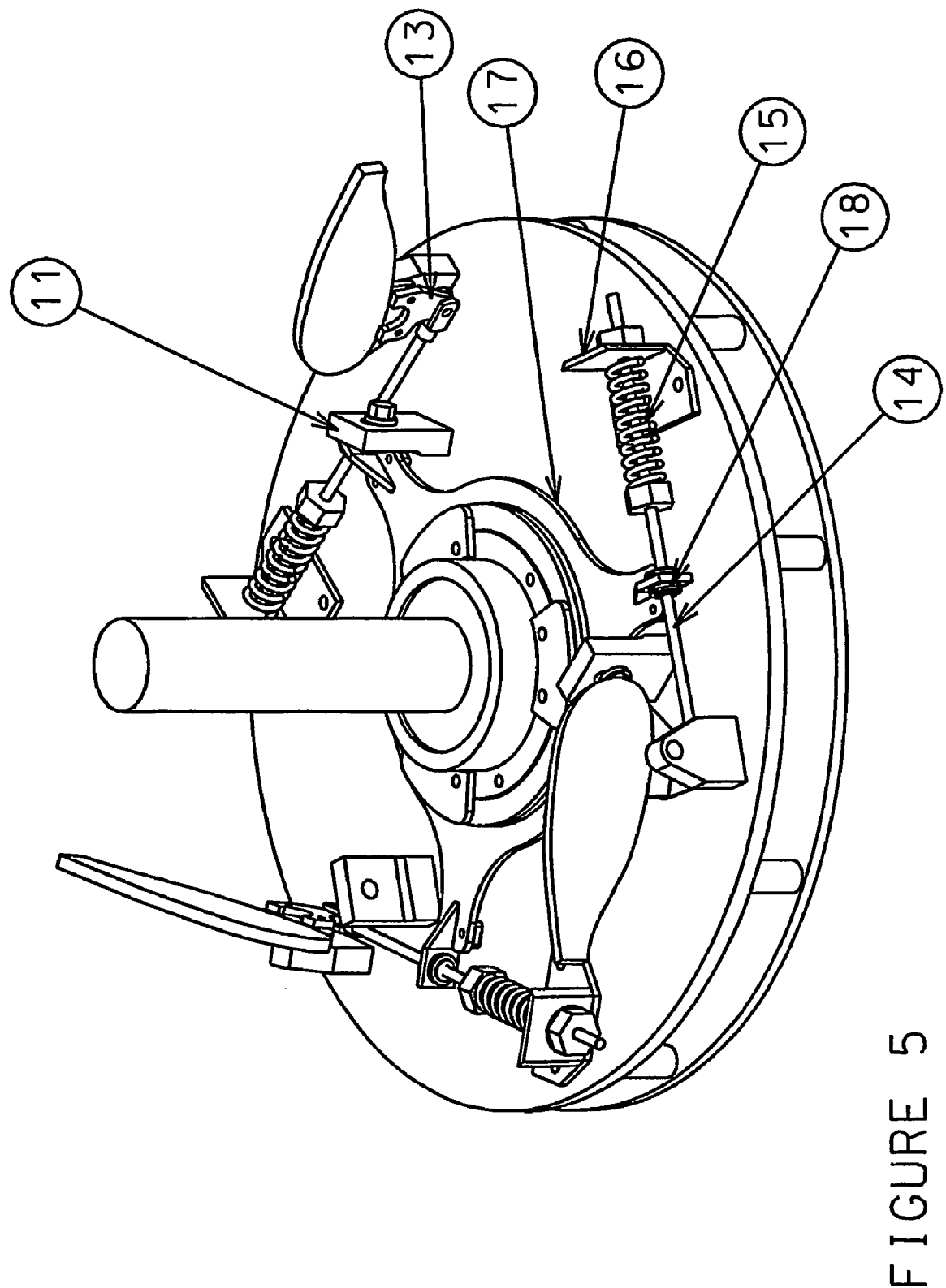
FIG. 5 shows a modification of the first embodiment of the invention in which the blade and pushrod assembly are mounted on a circular hub plate and connected to the pitch linkage plate, with blades not shown for clarity.
Figure 6:
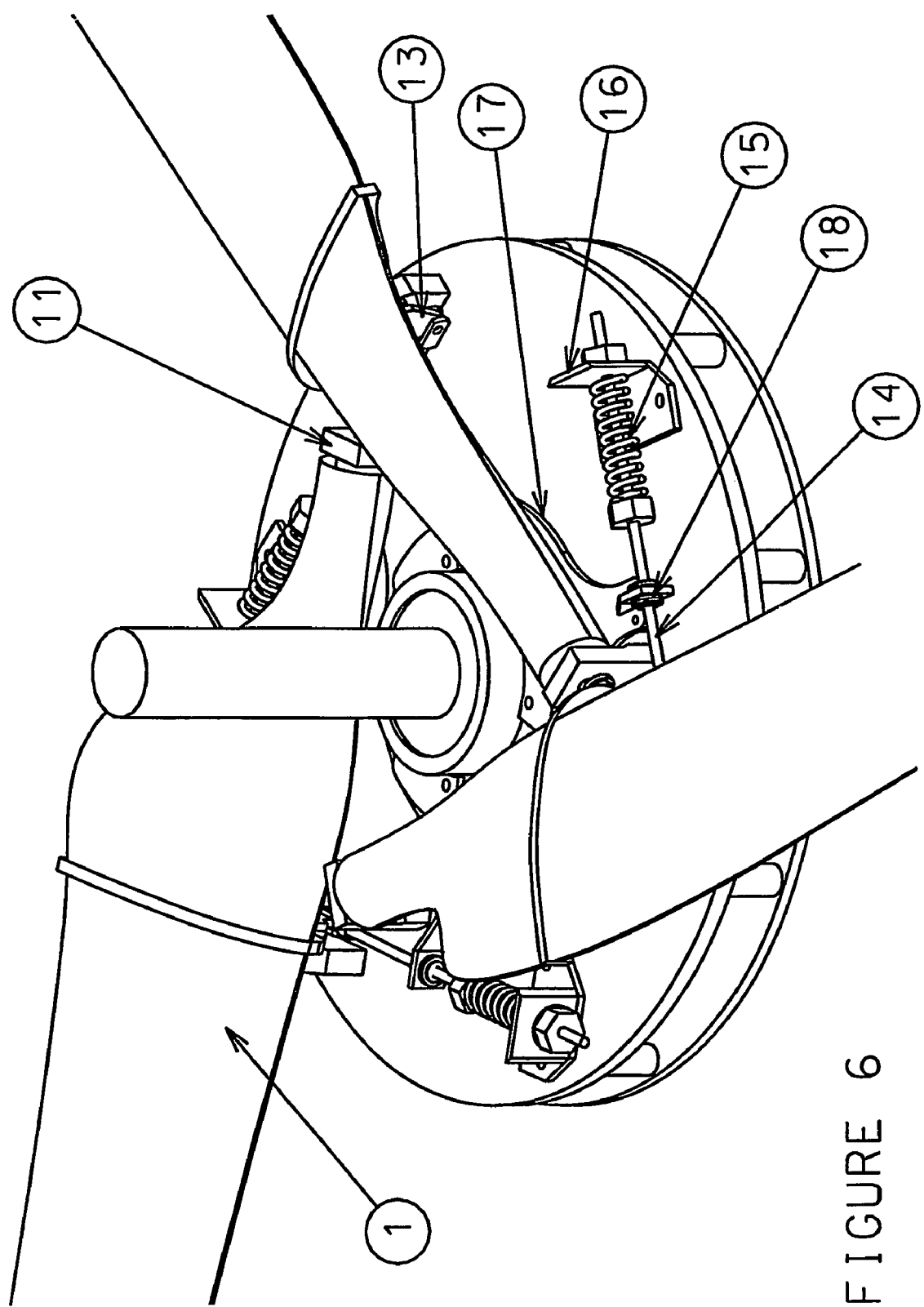
FIG. 6 shows the blade and pushrod assembly mounted on a circular hub plate and connected to the pitch linkage plate with blades shown.

The means of linking the three blades in pitch is illustrated in FIG. 5 and FIG. 6 which show an arrangement with three blades mounted on a circular hub plate. In order to link the blades in pitch a profiled plate (17) with connection points at each of its three apices is rotatably mounted on the turbine main axis parallel to the hub plate. Each pushrod (14) is attached to one of the connection points by radially compliant joint (18). Any change in blade pitch causes rotation of the plate (17) and an identical change in the pitch of all blades.

By separating the functions of the rotating pitch linkage plate and the requirement for a preload and resilient resistance to pitch, the loads transmitted by the pitch linkage plate are considerably reduced.

In the second method, the blades are not only connected in pitch, but are also subjected to a pitching moment towards stall that increases with increasing wind speed. This feature is able to bring the wind turbine to rest in extreme wind speeds.

Figure 7:
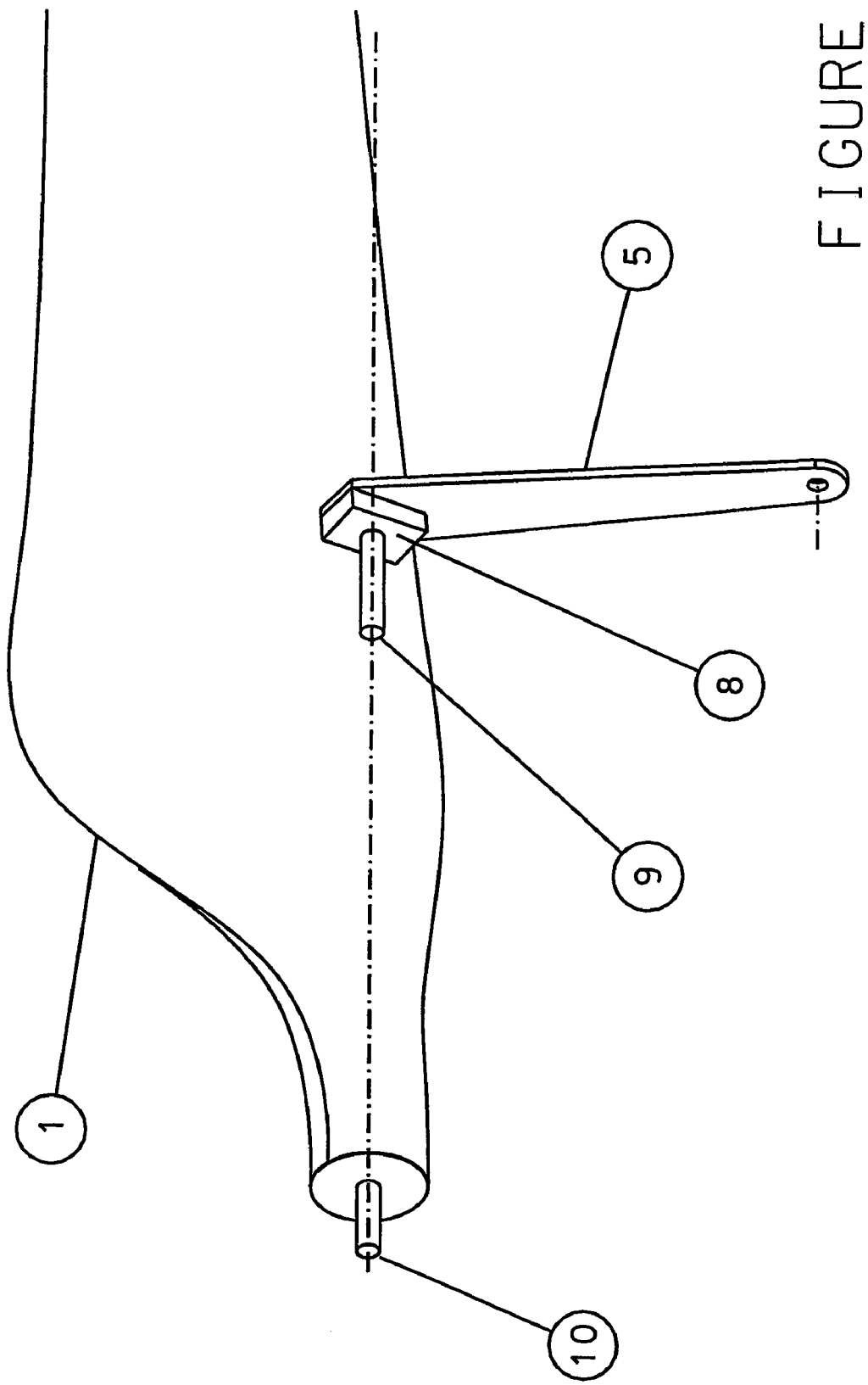
FIG. 7 is a view on the upwind root area of the blade of a second embodiment of the invention, showing the attachment of the outer blade pitch bearing and pitch arm and the blade end pitch pin.

FIG. 7 shows the location of the blade outer attachment (8) & (9) and pitch arm (5) which are rigidly attached to the upwind surface of the blade (1). It also shows the blade end pin (10) which is co-axial with the pitch axis and the outer blade attachment pin (9).

Figure 8:
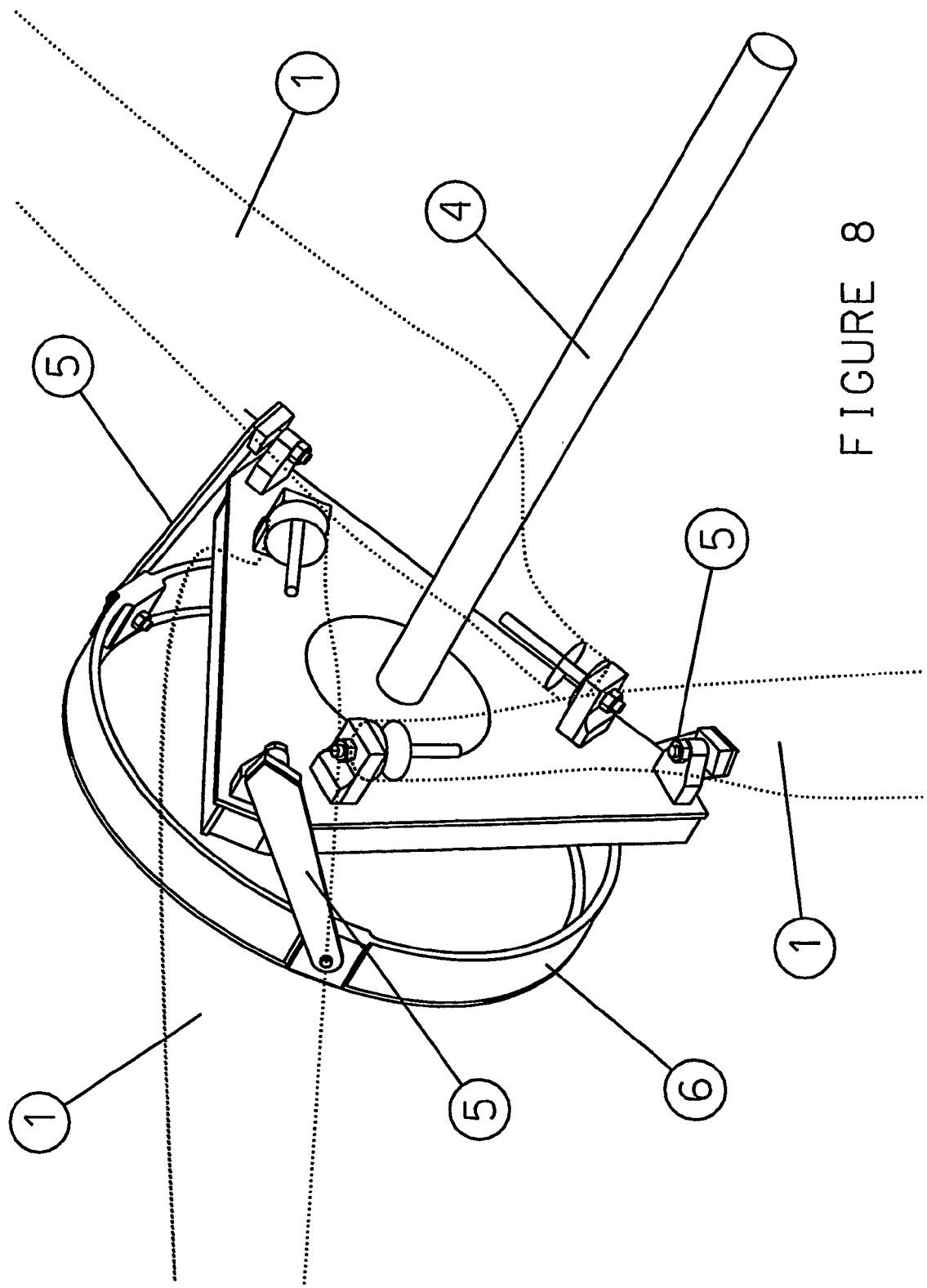
FIG. 8 is an isometric view of the turbine rotor from a downwind direction showing the inter-connection of the blades' pitch arms by the rigid annulus.

A means of inter-connecting the blades is shown in FIG. 8. The three blades (1), (drawn with dotted lines for clarity), are connected via their respective pitch arms (5) to a rigid annulus (6). Rotation of the blades (1) about their pitch axes causes both rotation and axial deflection of the rigid annulus (6) and thus each blade (1) is restrained to rotate about its pitch axis by an equal amount.

Figure 9:
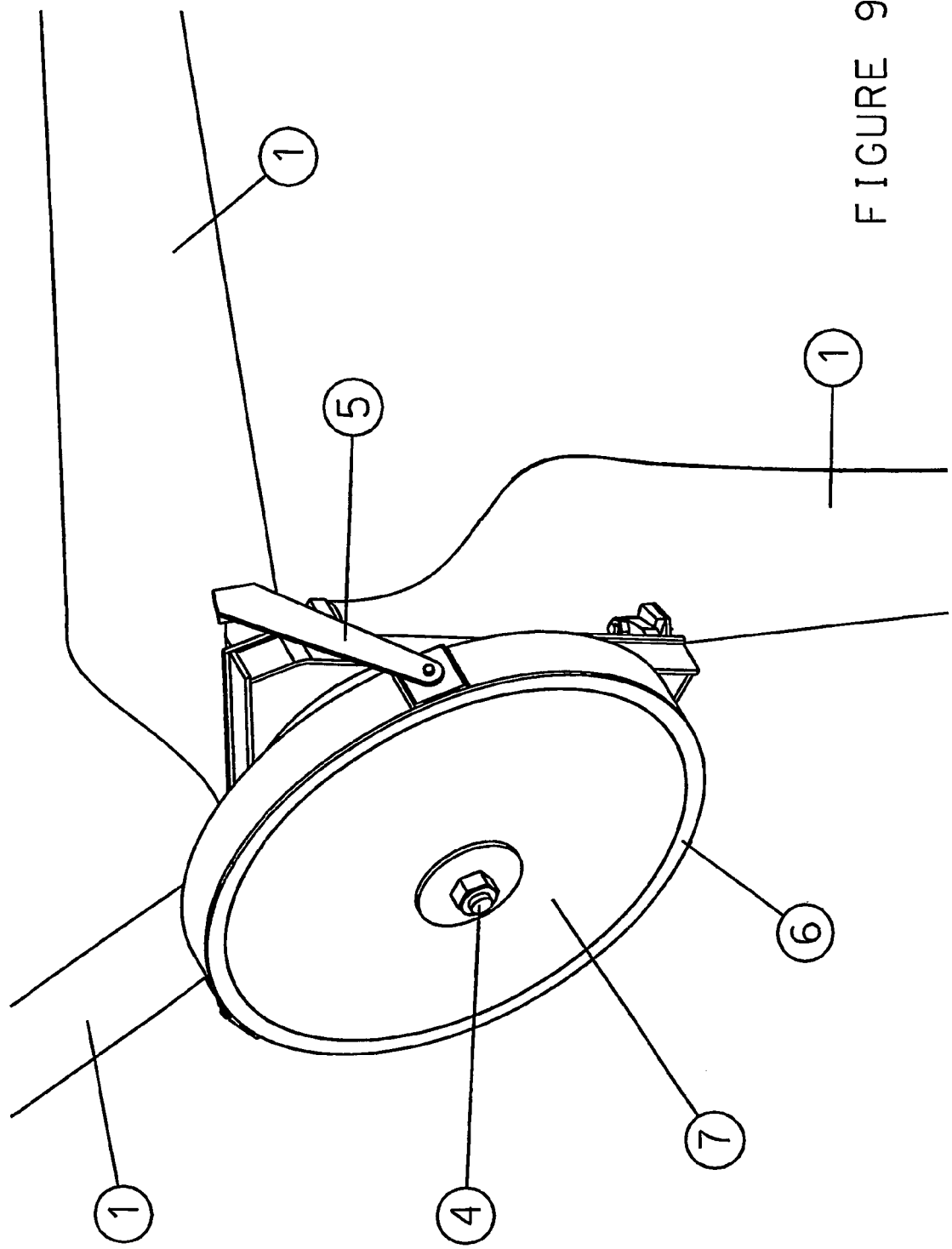
FIG. 9 is an isometric view of the turbine rotor from an upwind direction showing the rigid annulus located on the main shaft by the diaphragm spring member.

FIG. 9 shows the turbine rotor from the upwind direction with the blades (1) connected to the rigid annulus (6) by pitch arms (5). The rigid annulus (6) is attached to a diaphragm (7) which is located by its centre portion on the shaft (4), such that it is restrained in the radial and axial directions but free to rotate around the main axis of the rotor.

As the diaphragm (7) is restrained axially at its centre it is forced to deflect as the outer annular rim (6) moves axially and thereby behaves in such a way as to offer a biasing force to oppose this movement. The diaphragm (7) is positioned axially such that it acts as a biasing force to rotate the blades (1) about their pitch axes until they contact a fixed stop positioned to maintain them at a pre-selected pitch angle.

Figure 10:
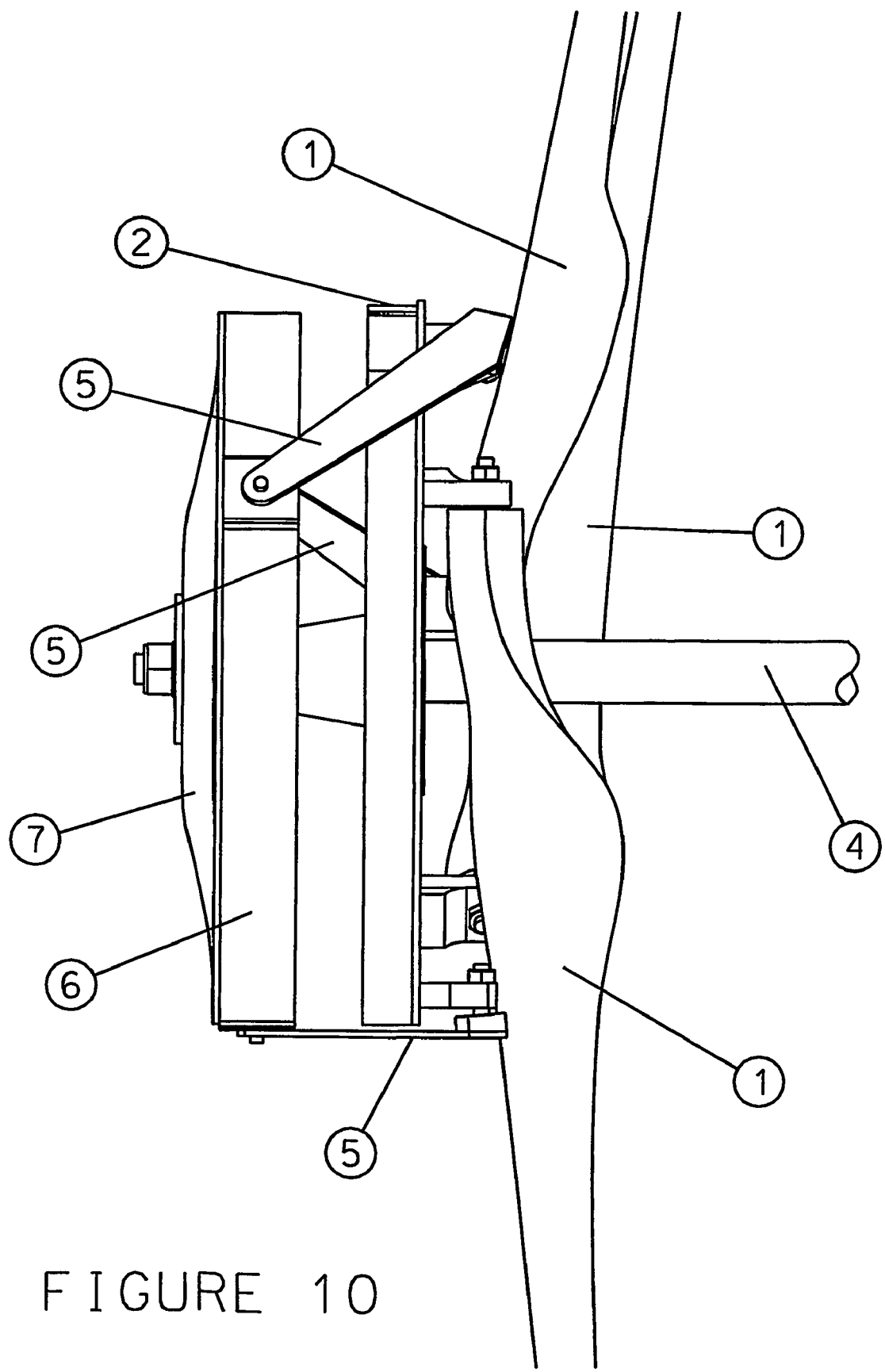
FIG. 10 is a side elevation of the turbine rotor showing the three blades connected to the rigid annulus and diaphragm spring damper.

FIG. 10 shows a side elevation of the turbine rotor with the diaphragm (7) deflected to give a pre-loaded spring bias to hold the blades (1) against the fixed stops until the pitch moment is sufficient to cause change in blade pitch. Therefore, the diaphragm is able to replace the function of the pre-loaded spring referred to in the previous case. It also provides a degree of pitch linkage that can replace the pitch linkage system described previously.

The pitch control diaphragm (7) is also arranged such that it will be acted upon by the full force of the prevailing wind. Careful sizing of this surface allows a predictable additional axial force to be applied to the annular outer rim (6) which is connected to the pitch arms which control blade pitch. Thus in a strong wind the aerodynamic resistance of this surface will automatically move the blades to a stall position. This system can be used to bring the wind turbine to rest in high winds.

The axial movement of the surface in conjunction with the change in pitch of the blade allows the surface to contribute a damping force proportional to the rate of change of pitch angle. This damping force is derived from changes in the wind speed acting on the diaphragm due to its movement and this can contribute significantly to improving the dynamic behaviour of the pitch system.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Further, the recited order of elements, steps or sequences, or the use of numbers, letters, or other designations therefore, is not intended to limit the claimed processes to any order except as may be explicitly specified in the claims. Accordingly, the invention is limited only by the following claims and equivalents thereto.

The invention claimed is:

1. A wind turbine with at least one blade having a pitch axis that is offset laterally so that the blade does not intersect with an axis of rotation of a rotor shaft of the wind turbine, and a center of mass and an aerodynamic center are offset from the pitch axis in the direction parallel to the axis of rotation of a rotor shaft of the wind turbine, the blade being arranged so that the blade can pitch towards stall against the action of a resilient device, and also so that the centrifugal loading on at least one of the blade, and one or more components attached to the blade, acts against the spring in a direction to shed power by pitching the blade towards stall and also so that the torque loading provided by a power conversion device acts to pitch the blade in the opposite direction, so as to reduce the amount of load shedding whenever the power is being extracted from the wind turbine.

2. A wind turbine as claimed in claim 1, wherein the wind turbine comprises two or more blades, wherein a pitch angle of each of the blades is made the same through a common pitch linkage system.

3. A wind turbine as claimed in claim 2, wherein the common pitch linkage system comprises a plate that rotates about the axis of rotation of the rotor shaft of the wind turbine.

4. A wind turbine as claimed in claim 1, wherein the wind turbine comprises two or more blades, wherein each of the blades is attached at a blade end connection point and at an outboard connection point and wherein the blades are arranged so that the blade end connection of each of the blades is adjacent to or coincident with the outboard connection of for another one of the blades.

5. A wind turbine as claimed in claim 4, wherein the blades are attached directly onto the rotor shaft.

6. A wind turbine as claimed in claim 1, wherein the wind turbine comprises two or more blades, wherein the blades are linked to each other by pitch members, each of the pitch members is connected at one end to one of the blades such that they rotate with changes in pitch of the blade and to a rigid annulus at the other end which is constrained radially, but is allowed to rotate about the axis of rotation of the rotor shaft of the wind turbine.

7. A wind turbine as claimed in claim 6, wherein the annulus linking the pitch members is constrained axially by a resilient member which provides a biasing force such that axial movement away from an equilibrium position of the annulus results in a resistance due to deflection of the resilient member which acts on the pitch members connected to the annulus in order to oppose rotation of the blades about their pitch axis.

8. A wind turbine as claimed in claim 7, further comprising fixed stops which set the initial pitch angle of the blades and apply a pre-load to the resilient member which maintain the blades at a nominal pitch angle until a selected pitch moment is achieved.

9. A wind turbine as claimed in claim 7, wherein the resilient member is a circular diaphragm.

10. A wind turbine as claimed in claim 9, wherein the circular diaphragm is subjected to a pre-load by restraining the blades from pitching past a certain point using fixed stops and by securing a center portion of the diaphragm axially removed from the equilibrium position of the diaphragm.

11. A wind turbine as claimed in claim 7, wherein the annulus is connected to a surface so disposed with relation to wind direction that an aerodynamic resistance of the surface exerts an axial force on the annulus which varies with the wind speed.

12. A wind turbine as claimed in claim 11, wherein the axial force exerted by the surface acts to move the ends of the pitch members axially thereby causing the blades to pitch.

13. A wind turbine as claimed in claim 11, wherein the axial movement of the surface which results from a change in pitch of the blades due to rotation about their pitch axes is resisted by a force proportional to the speed of axial deflection due to the air resistance of the surface thereby providing a damping force to oppose rapid changes in the pitch of the blades.

* * * * *